C. GABRIELSON.
ADJUSTABLE GEARING FOR MILLING MACHINES.
APPLICATION FILED JUNE 10, 1920.
1,425,848.
Patented Aug. 15, 1922.
4 SHEETS—SHEET 3.
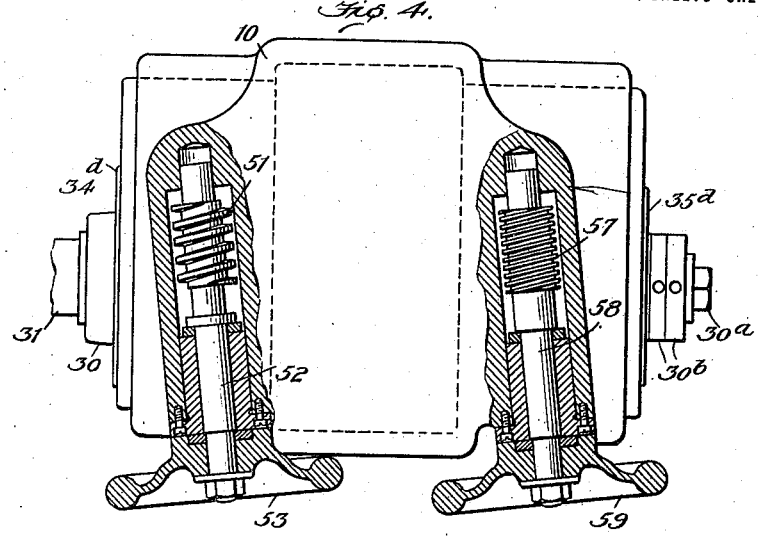
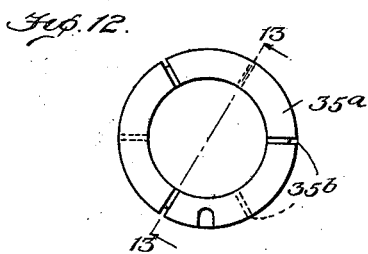
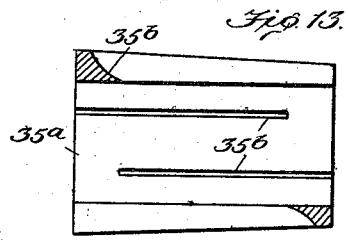
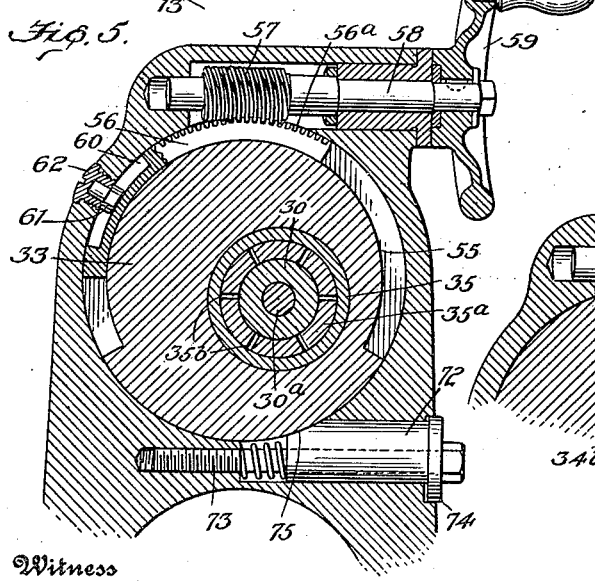
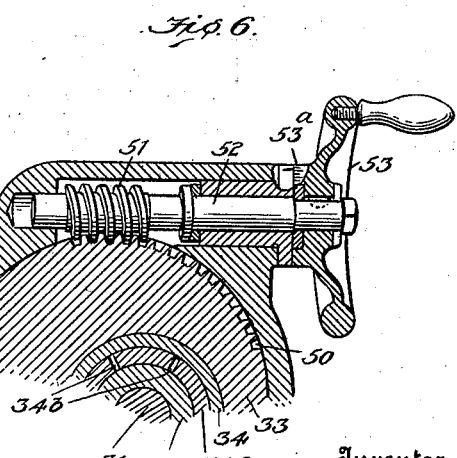
Witness
Edwin L. Bradford
Inventor
Carl Gabrielson,
By Watson, Cox, Morse & Grindle
Attorneys.

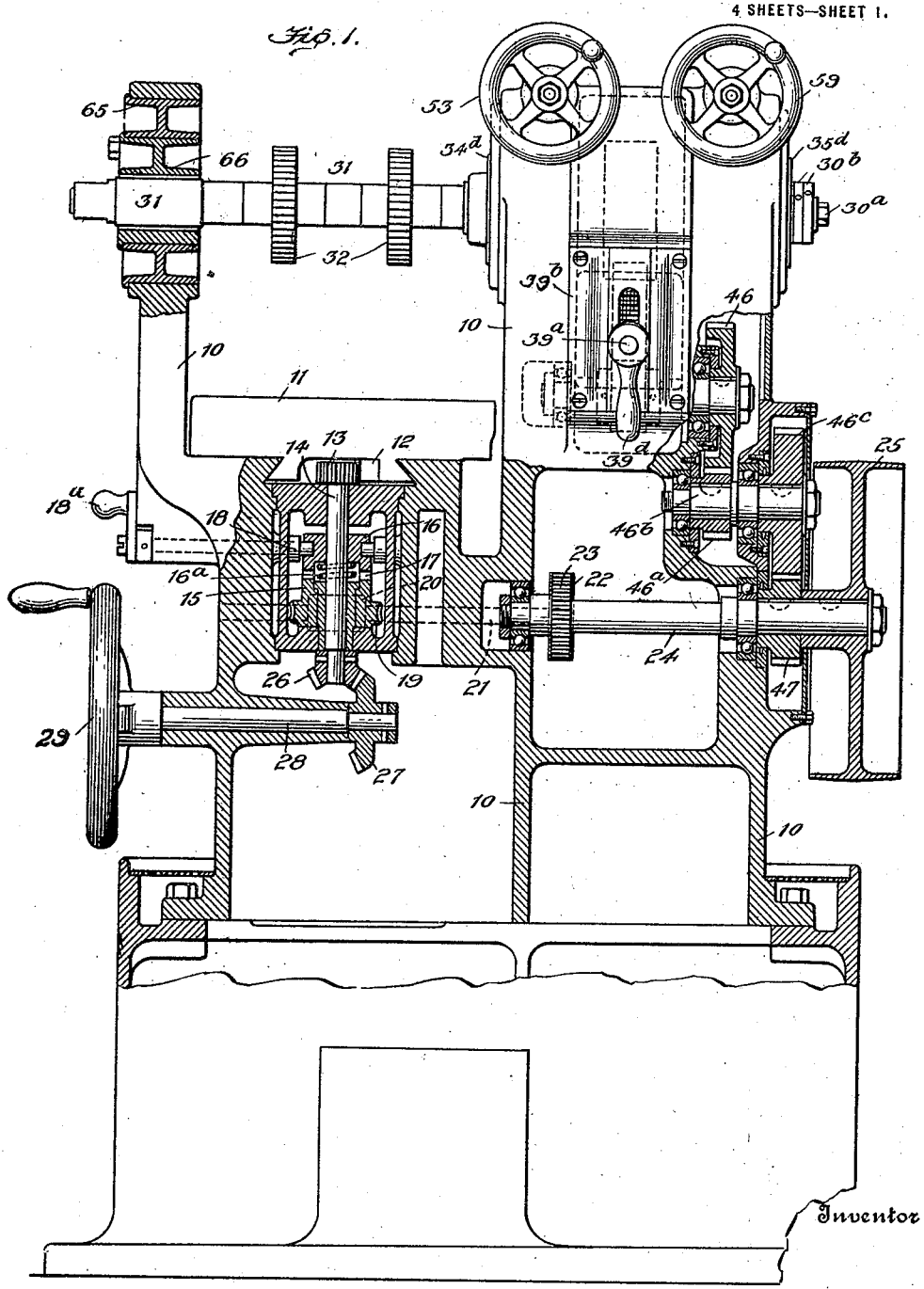

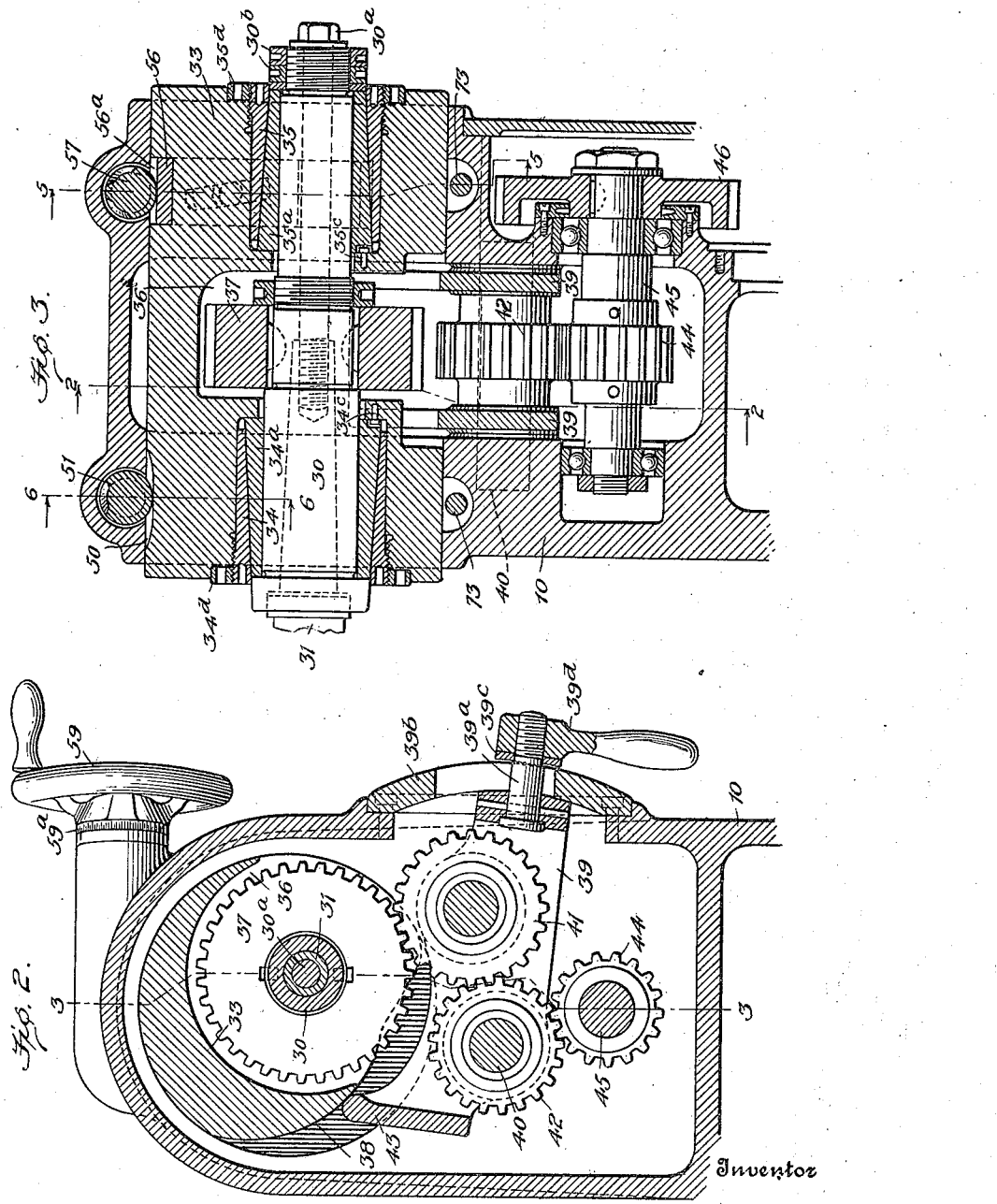

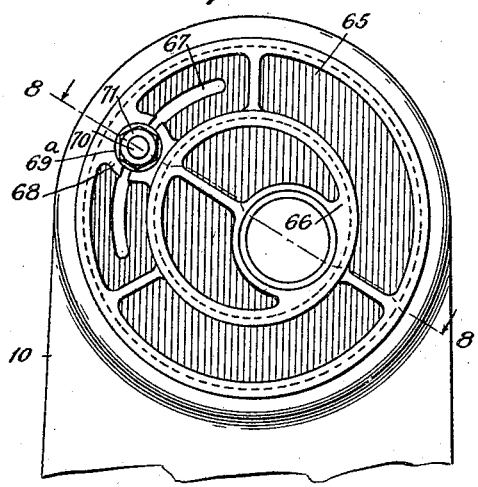
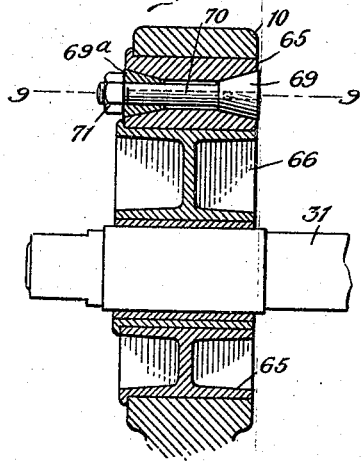
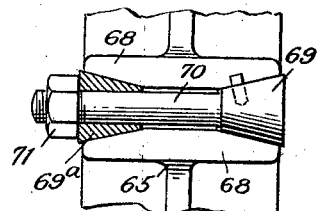
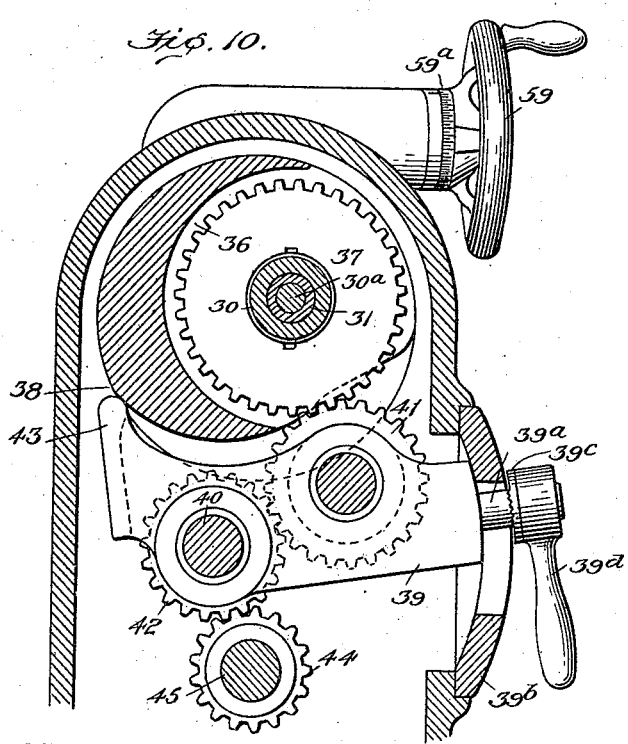
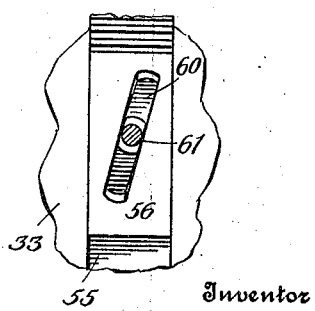

UNITED STATES PATENT OFFICE.

CARL GABRIELSON, OF SYRACUSE, NEW YORK, ASSIGNOR, BY MESNE ASSIGNMENTS, TO MELDRUM-GABRIELSON CORPORATION, OF SYRACUSE, NEW YORK, A CORPORATION OF NEW YORK.

ADJUSTABLE GEARING FOR MILLING MACHINES.

1,425,848.  Specification of Letters Patent.  Patented Aug. 15, 1922.

Application filed June 10, 1920. Serial No. 388,014.

*To all whom it may concern:*

Be it known that I, CARL GABRIELSON, a citizen of the United States, and residing at Syracuse, Onondaga County, State of New York, have invented certain new and useful Improvements in Adjustable Gearing for Milling Machines, of which the following is a specification.

This invention relates to milling machines and particularly to certain improvements in the means for adjusting the cutters with reference to the work and the driving mechanism employed for operating the spindle and arbor upon which the cutters are mounted.

It is one of the objects of the invention to provide mechanism for supporting the spindle of a milling machine so that the arbor secured in the spindle may be quickly and accurately adjusted toward and from the work supporting table and to also provide mechanism by which the spindle can be securely locked in position after such adjustment. A further object is to provide improved driving mechanism for the spindle and the cutter carrying arbor mounted therein which will operate effectively as the arbor is adjusted toward and from the work. The foregoing and other objects are attained by means of the construction described in the following specification and illustrated in the accompanying drawings in which:

Figure 1 represents an end view of a milling machine having my improvements applied thereto, certain parts appearing in section;

Figure 2 is a transverse sectional view on the line 2—2 of Figure 3, certain parts appearing in elevation;

Figure 3 is a sectional view on the line 3—3 of Figure 2;

Figure 4 is a plan view with certain parts in section showing the detailed construction of certain features of the invention;

Figure 5 is a transverse sectional view on the line 5—5 of Figure 3, looking in the direction of the arrows;

Figure 6 is a transverse sectional view on the line 6—6 of Figure 3, looking in the direction of the arrows;

Figure 7 is a side view of a portion of the machine showing the means for supporting one end of the cutter carrying arbor;

Figure 8 is a sectional view on the line 8—8 of Figure 7;

Figure 9 is a sectional view on the line 9—9 of Figure 8;

Figure 10 is a sectional view similar to that of Figure 2 showing certain of the parts in a different position;

Figure 11 is a detailed view showing the construction of certain parts of the mechanism employed for moving the spindle;

Figure 12 is an end view of one of the split bearings in which the spindle is mounted;

Figure 13 is a sectional view on the line 13—13 of Figure 12.

Referring to the drawings in detail, the numeral 10 represents generally the frame of the machine on which the various parts of the mechanism hereinafter referred to are mounted. A work supporting table 11 is mounted on the frame 10 by means of the usual dove-tailed construction which permits movement of said table relative to said frame. On each side of the table 11 the frame 10 extends upwardly for some distance above the table for a purpose which will later appear.

Any suitable mechanism may be employed for moving the work table on the frame 10. The mechanism illustrated in the drawings consists of a rack 12 secured beneath the table which rack is engaged by a pinion 13 mounted on a vertical shaft 14 journaled in a suitable support arranged beneath the table. A collar 15 surrounds the lower portion of the shaft 14 and a second collar 16 surrounds the upper portion thereof. The collar 15 is free to rotate independently of the shaft 14 while the collar 16 is keyed to said shaft. The collars 15 and 16 are provided with interengaging clutch teeth 17 and a spring 16$^a$ arranged between said collars normally holds the same separated. A crank member 18 engages a groove in the collar 16, which crank member can be operated by a hand lever 18$^a$, it being understood that when said hand lever 18$^a$ is moved in one direction the collar 16 will be engaged with the collar 15 and that when said hand lever is moved in the opposite direction disengagement of said parts takes place. The collar 15 carries a worm wheel 19 which is engaged by a worm 20 secured to a shaft 21 journaled in the frame 10. The shaft 21 carries a gear 22 which meshes with a gear 23 secured to a second shaft 24 also journaled in the frame 10, the shaft 24 being provided with a pulley 25 by which the same may be driven.

It will be understood that as the shaft 24 is rotated it will cause rotation of the shaft 21 and through the medium of the worm 20 and worm wheel 19 rotation of the collar 15 will result. Such rotation of the collar 15 will cause movement of the table 11 whenever the collar 16 is engaged with the collar 15.

At its lower end, the shaft 14 carries a bevel gear 26 which meshes with a bevel gear 27 carried by a shaft 28 journaled in the frame 10, this shaft being provided with a hand wheel 29. By means of this mechanism the table 11 may be manually moved on the frame 10.

As hereto noted portions of the frame 10 extend upwardly on each side of the table 11. Within such upwardly extending portion of the frame on one side of the table there is rotatably mounted a sleeve 33 in which a spindle 30 is eccentrically journaled. The spindle 30 is adapted to receive and securely hold a cutter carrying arbor which projects above the top of the table and which may be of any length desired depending on the character of the work. The spindle is provided with a tapered recess or socket in which the arbor may be secured. As shown in the drawings the arbor 31 carrying cutters 32 is supported in the socket of the spindle 30 and extends entirely across the top of the table 11 where it is supported in a particular form of bearing hereinafter described. The arbor 31 is held in the spindle 30 by means of a bolt $30^a$ which extends through a part of the spindle and engages in a threaded opening in the end of the arbor. The end of the spindle 30 opposite the arbor 31 is threaded and nuts $30^b$ are mounted on such threaded portion and serve to hold the spindle in position in its bearings.

The spindle 30 is mounted in cylindrical bearings $34^a$, $35^a$ which are cone-shaped on their exterior surfaces and which are split as shown at $35^b$ in Figures 12 and 13 of the drawings, these figures representing the bearing $35^a$ which it is to be understood is identical with the bearing $34^a$. The bearings $34^a$ and $35^a$ are prevented from rotation in the sleeve 33 by means of pins $34^c$, $35^c$ secured in said sleeve and engaging recesses in the bearings. The bearings are surrounded by bushings 34 and 35 respectively which closely fit the bearings and which are threaded into the sleeve 33, being held in adjusted position by means of nuts $34^d$, $35^d$. By loosening these nuts the bushings may be turned to cause contraction or permit expansion of the split bearings $34^a$, $35^a$ surrounding the spindle 30.

The sleeve 33 is provided with a cut-out portion 36 and a gear wheel 37 secured to the spindle 30 is arranged in such cut-out portion of the sleeve 33. The outer surface of the sleeve 33 adjacent said cut-out portion is provided with a cam surface 38 for a purpose which will hereinafter appear.

Beneath the sleeve 33 a rocker 39 is pivotally supported in the frame 10 by means of a short shaft 40. At one side of its pivotal point the rocker 39 carries a gear wheel 41 which is adapted to mesh with the gear wheel 37 carried by the spindle 30. A gear wheel 42 is journaled on the shaft 40 concentrically with the pivot of the rocker 39. The gears 41 and 42 are so arranged as to be constantly in mesh with each other. At its end opposite the gear wheel 41 the rocker 39 is provided with an upwardly extending portion or heel 43 which is so positioned as to engage the cam surface 38 formed on the sleeve 33. The parts are so arranged that the heel 43 will always remain in contact with the cam surface 38, and such cam surface is so shaped that as the position of the sleeve 33 is changed, as will later be pointed out, the gear wheel 41 will be maintained closely in mesh with the gear wheel 37. If desired the rocker 39 may be provided with upwardly extending portions on each side of its pivot point and a cam surface provided on the sleeve 33 for each of such upwardly extending portions. In order to secure increased rigidity, the rocker 39 is provided with means by which it may be locked to the frame of the machine, such means comprising a bolt $39^a$ secured to the rocker 39 and extending through a fixed clamp plate $39^b$, and carrying a curved clamp plate $39^c$, and a handled nut $39^d$ by which such plates may be locked together.

Means are provided for driving the gear wheel 42, such means comprising a gear wheel 44 mounted on a shaft 45 which carries a gear wheel 46 meshing with a gear wheel $46^a$ carried by an intermediate shaft $46^b$ to which shaft there is also secured a gear wheel $46^c$ which meshes with a gear wheel 47 secured to the shaft 24 heretofore mentioned.

In order to provide for movement of the spindle 30 and cutter carrying arbor toward and from the table and transversely thereof, mechanism is provided for rotating the sleeve 33 in the frame and for moving such sleeve endwise. This mechanism will now be described. On the upper portion of its outer surface the sleeve 33 is provided with a series of teeth 50 which extend parallel to the longitudinal axis of the sleeve. A worm 51 is arranged to engage the teeth 50 this worm being mounted on a shaft 52 journaled in suitable bearings in the frame 10 of the machine. The shaft 52 is provided with a hand wheel 53 by which the shaft and the worm secured thereto may be rotated. It will be understood that rotation of the shaft 52 and the worm 51 causes rotation of the sleeve 33 in its bearing, and since the spindle 30 is eccentrically mounted in the sleeve 33 such rotation of the sleeve results in movement of the spindle and an arbor carried thereby will be caused to move toward or from the table 11.

Referring particularly to Figure 4 of the drawing it will be noted that the shaft 52 carrying the worm 51 is not arranged at right angles to the axis of the sleeve 33 but is offset or skewed to such an angle that endwise movement of the sleeve is permitted although the worm is constantly in mesh with the teeth. In short the parts are so positioned that the line of axis of the worm is arranged at an angle with a plane perpendicular to the axis of the sleeve equal to the pitch of the worm. Such arrangement permits the sleeve to be moved endwise while the worm remains in engagement with the teeth 50.

To secure endwise movement of the sleeve 33 the following mechanism is provided. The sleeve 33 on its periphery is provided with a groove 55 extending transversely of the axis of the sleeve and over the major portion of the circumference thereof. A rack member 56 is arranged in said groove, this rack member being shorter than the groove 55 but closely fitting the sides thereof. The rack member 56 on its exterior surface is provided with a series of teeth 56ª with which a worm 57 engages, this worm being secured to a shaft 58 suitably journaled in the frame of the machine and provided with a hand wheel 59 by which it may be rotated. It will be understood that as the shaft 58 and worm 57 secured thereto are rotated the rack member 56 will be caused to move in the groove 55 transversely to the axis of the sleeve 33. The rack member 56 is provided on its exterior surface with a groove 60, Figure 11, which is angularly arranged with reference to the sides of said member. A stud 61 is arranged in said groove 60, this stud being mounted in the frame of the machine by means of a screw 62.

From the foregoing construction it will be understood that as the rack member 56 is moved in the groove 55 by means of the worm 57 the sleeve 33 will be caused to move endwise, that is, in a direction parallel to the axis of the spindle 30.

By again referring to Figure 4 of the drawings it will be seen that the shaft 58 carrying the worm 57 is also arranged at an angle with the axis of the sleeve 30. This arrangement like that of the shaft 52 and the worm 51 is such as to permit movement of the rack member 56 transversely of the worm 57. The angularity of the shaft 58 with reference to a plane perpendicular to the axis of the sleeve 30 corresponds to the pitch of the worm 57, this arrangement being the same as that heretofore described in connection with the worm 51 of the shaft 52.

In order that the extent of adjustment of the sleeve 33 both transversely and endwise may be accurately determined, the parts are so arranged that one rotation of the hand wheel 53 or 59 will move the sleeve .1 of an inch. Each of said hand wheels is provided with a series of graduations, preferably 100, so that the movement of the sleeve can be read to .001 of an inch.

It has already been mentioned that cutter carrying arbors of any desired length may be employed in the present machine. Where it is necessary to use an arbor such as that shown in the drawings which extends entirely across the top of the table it is desirable to support the end of the same in bearings which when unlocked will not interfere with movement of the spindle but will permit adjustment of the arbor toward and from the table. Such means comprise a bushing 65 which is rotatably mounted in a part of the frame 10 and a bushing 66 rotatably mounted in the bushing 65. The bushing 66 is provided with an opening arranged eccentrically therein in which opening the arbor 31 is journaled. The eccentric arrangement of the arbor 31 in the bushing 66 corresponds to the arrangement of the spindle 30 in the sleeve 33, so that when said sleeve is rotated to adjust the position of the spindle 30 and the arbor mounted therein, as heretofore pointed out, the bushing 66 will also rotate, it being understood that at such times the parts are unlocked so as to permit free rotation of said bushing. In order to provide for locking the bushings 65 and 66 in position after the arbor 31 has been adjusted to any desired position the bushing 65 is slotted as at 67 which slot extends for a considerable distance in a direction parallel to the outer circumference thereof. The slot extends through an enlarged portion 68 of the bushing and in such enlarged portion two wedge-shaped members 69 and 69ª are arranged, the former constituting the rigid head of a bolt 70 and the latter being mounted on said bolt. The bolt extends through the bushing 65 and is provided with a nut 71 by which the wedge-shaped members 69 and 69ª may be drawn toward each other and the bushing 65 expanded so that the same will be securely locked or clamped to the frame of the machine and also to the bushing 66 mounted therein.

In order to hold the sleeve 33 securely in any position to which it may be adjusted the following means are provided. In the frame 10 beneath the sleeve 33 openings are provided in which cylindrical wedge members 72 are movably mounted. Bolts 73 are arranged in said members, such bolts being threaded at the inner ends into the frame 10 and carrying at their outer ends heads 74 adapted to contact with the wedge members 72. The inner ends of the wedge members 72 are slightly beveled at 75 such beveled portions being positioned to contact with and clamp the sleeve 33 against rotation when the bolts 73 are threaded into the frame 10.

The operation of the various parts of the mechanism have already been pointed out and further description of such operation is deemed unnecessary. While numerous details of construction are shown and described it is to be understood that the invention is not limited to the particular form and arrangement set forth but contemplates other specific arrangements which may fairly come within the spirit of the invention and within the scope of the appended claims.

What I claim as my invention and desire to secure by Letters Patent is:

1. In a machine of the kind described, the combination of a frame, a sleeve rotatably supported thereon, a spindle journaled eccentrically in said sleeve, a gear wheel secured to said spindle, a rocker pivoted on said frame, a gear wheel rotatably supported on said rocker in mesh with said first named gear wheel, means for holding said gear wheels in mesh as the position of said sleeve is changed, and means for driving said rocker-supported gear wheel.

2. In a machine of the kind described, the combination of a frame, a sleeve rotatably supported thereon, a spindle journaled eccentrically in said sleeve, a gear wheel secured to said spindle, a rocker pivoted on said frame, a gear wheel rotatably supported on said rocker in mesh with said first named gear wheel, cooperating means on said sleeve and said rocker for holding said gear wheels in mesh as the position of said sleeve is changed, and means for driving said rocker-supported gear wheel.

3. In a machine of the kind described, the combination of a frame, a sleeve rotatably supported therein, a spindle journaled eccentrically in said sleeve, a gear wheel secured to said spindle, a second gear wheel journaled on said frame, a rocker pivoted concentrically with said second named gear wheel, a gear wheel rotatably supported on said rocker and meshing with said second gear wheel, means on said sleeve arranged to contact with said rocker and hold said rocker-supported gear wheel in mesh with said first named gear wheel as said sleeve is rotated in the frame, and means for driving said second gear wheel.

4. In a machine of the kind described, the combination of a frame, a sleeve rotatably supported therein, a spindle journaled eccentrically in said sleeve, means for rotating said sleeve to raise and lower said spindle, a gear wheel secured to said spindle, a second gear wheel journaled on said frame, means for driving said second gear wheel, a rocker pivoted concentrically with said second gear wheel, a gear wheel rotatably supported on said rocker and meshing with said second gear wheel, said sleeve having a cam surface formed thereon, and said rocker having a part arranged to engage said cam surface to hold said rocker-supported gear in mesh with said first named gear as the position of said sleeve is changed.

5. In a machine of the kind described, the combination of a frame, a sleeve rotatably supported therein, a spindle journaled eccentrically in said sleeve, said sleeve having a cut-out portion and also having a cam surface on the exterior thereof, a gear wheel on said spindle arranged in the cut out portion of the sleeve, a second gear wheel rotatably mounted on said frame, a rocker arranged adjacent the cut out portion of the sleeve and pivotally supported on said frame concentrically with said second gear wheel, a gear wheel rotatably supported on said rocker at one side of its pivot point and in mesh with said second gear wheel, means on said rocker at the other side of its pivot point for engaging the cam surface on said sleeve, whereby said rocker-supported gear wheel is maintained in mesh with said first named gear wheel as said sleeve is rotated, and means for driving said second gear wheel.

6. In a machine of the kind described, the combination of a frame, a sleeve rotatably supported therein, a spindle journaled eccentrically in said sleeve, means for rotating said sleeve to raise and lower said spindle, means for locking said sleeve in position, a gear wheel secured to said spindle, a second gear wheel journaled on said frame, means for driving said second gear wheel, a rocker pivoted concentrically with said second gear wheel, a gear wheel rotatably supported on said rocker and meshing with said second gear wheel, said sleeve having a cam surface formed thereon, said rocker having a part arranged to engage said cam surface to hold said rocker-supported gear wheel in mesh with said first named gear wheel as the position of said sleeve is changed, and means for locking said rocker in position.

7. In a machine of the kind described, the combination of a frame, a sleeve movably supported therein, a spindle journaled in said sleeve, said sleeve having a groove in the surface thereof extending transversely of the axis of the spindle, a rack member shorter than said groove slidably mounted therein and closely fitting the sides thereof, a worm mounted in said frame and engaging said rack member for moving the same in said groove, and cooperating means on said rack member and said frame for causing the rack member and sleeve to move in a direction parallel to the axis of the spindle when said rack member is moved in said groove.

8. In a machine of the kind described, the combination of a frame, a sleeve movably supported therein, a spindle journaled in said sleeve, a rack member mounted on said sleeve and movable transversely of the axis of the spindle, means for preventing relative movement of said rack member and said sleeve in a direction parallel to the axis of said spindle, means for moving said rack member transversely of the axis of the spindle, and cooperating means on said rack member and said frame for causing the rack member and sleeve to move in a direction parallel to the axis of the spindle when said rack member is moved transversely thereof.

9. In a machine of the kind described, the combination of a frame, a sleeve movably supported therein, a spindle journaled in said sleeve, said sleeve having a groove in the surface thereof extending transversely of the axis of the spindle, a rack member shorter than said groove slidably mounted therein and closely fitting the sides thereof, a worm mounted in said frame and engaging said rack member for moving the same in said groove, said rack member having a groove therein angularly arranged with respect to the sides of the same, and a stud mounted on said frame and projecting into said last named groove, whereby movement of said rack member in the groove of the sleeve will cause movement of said sleeve.

10. In a machine of the kind described, the combination of a frame, a sleeve movably supported therein, a spindle eccentrically journaled in said sleeve, said sleeve having a groove in the surface thereof extending transversely of the axis of the spindle, a rack member shorter than said groove closely fitting the same and slidably mounted therein, the teeth of said rack extending parallel with the axis of the sleeve, a worm mounted in said frame and engaging said rack member for moving the same in said groove, cooperating means on said rack and said frame for causing said sleeve to move endwise when said rack member is moved, and the axis of said worm being arranged at such angle with the teeth of the rack that endwise movement of the sleeve and movement of the rack transversely of the worm is permitted.

11. In a milling machine, the combination of a frame, a sleeve rotatably supported therein, a spindle journalled eccentrically in said sleeve, a gear wheel secured to said spindle, a second gear wheel, adjustable means for supporting said second gear wheel and holding the same in mesh with said first named gear wheel as the position of said sleeve is changed, and means for driving said second named gear wheel.

12. In a milling machine, the combination of a frame, a spindle mounted therein, means for changing the position of the axis of said spindle, a gear wheel secured to said spindle, a second gear wheel, adjustable means for supporting said second gear wheel and holding the same in mesh with said first named gear wheel as the position of the axis of said spindle is changed, and means for driving said second named gear wheel.

13. In a milling machine, the combination of a frame, a spindle mounted therein, means for changing the position of the axis of said spindle, a gear wheel secured to said spindle, a rocker pivoted on said frame, a gear wheel rotatably supported on said rocker in mesh with said first named gear wheel, means for securing said rocker in different positions to maintain said second named gear wheel in mesh with the first named gear wheel when the position of the spindle is changed, and means for driving said second named gear wheel.

14. In a milling machine, the combination of a frame, a rocker pivotally supported in the frame, a gear wheel mounted coaxially with the pivot of said rocker, a gear wheel supported on said rocker in mesh with the first named gear wheel, a spindle movably mounted in said frame, means for changing the position of the axis of said spindle, a gear wheel secured to said spindle, said last named gear wheel being adapted to mesh with said rocker supported gear wheel, means for locking said rocker in different positions to hold said rocker supported gear wheel in mesh with the gear wheel secured to said spindle, and means for driving said first named gear wheel.

In testimony whereof I affix my signature.

CARL GABRIELSON.